US011119595B2

(12) United States Patent
Tan et al.

(10) Patent No.: US 11,119,595 B2
(45) Date of Patent: Sep. 14, 2021

(54) TOUCH DISPLAY PANEL AND MANUFACTURING METHOD FOR REDUCING INTERFERENCE WITH TOUCH SIGNAL

(71) Applicants: Chengdu BOE Optoelectronics Technology Co., Ltd., Sichuan (CN); BOE TECHNOLOGY GROUP CO., LTD., Beijing (CN)

(72) Inventors: Wen Tan, Beijing (CN); Tianyi Cheng, Beijing (CN); Fei Yu, Beijing (CN); Meng Li, Beijing (CN); Tiaomei Zhang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/623,625

(22) PCT Filed: Jun. 3, 2019

(86) PCT No.: PCT/CN2019/089884
§ 371 (c)(1),
(2) Date: Dec. 17, 2019

(87) PCT Pub. No.: WO2020/001239
PCT Pub. Date: Jan. 2, 2020

(65) Prior Publication Data
US 2021/0072853 A1    Mar. 11, 2021

(30) Foreign Application Priority Data

Jun. 29, 2018    (CN) .......................... 201810715254.X

(51) Int. Cl.
*G06F 3/041* (2006.01)

(52) U.S. Cl.
CPC .. *G06F 3/0412* (2013.01); *G06F 2203/04103* (2013.01)

(58) Field of Classification Search
CPC ...... G06F 3/041; G06F 3/0412; G06F 3/0414; G06F 3/0416; G06F 3/044; G06F 3/045; G06F 3/046; G06F 3/047
(Continued)

(56) References Cited

U.S. PATENT DOCUMENTS 8,134,527 B2    3/2012  Chien et al.
2008/0211394 A1*  9/2008  Koshihara ............. G06F 3/0444
                                                          313/504
(Continued)

FOREIGN PATENT DOCUMENTS

CN    202394197 U    8/2012
CN    103034377 A    4/2013
(Continued)

OTHER PUBLICATIONS

Chinese Office Action dated Jan. 15, 2020, from application No. 201810715254.X.
(Continued)

*Primary Examiner* — Amare Mengistu
*Assistant Examiner* — Nelson Lam
(74) *Attorney, Agent, or Firm* — Arch & Lake LLP

(57) ABSTRACT

The present disclosure relates to a touch display panel and a method for manufacturing the same. The display panel includes: an active area disposed on a substrate and including a light emitting device; a raised area disposed on the substrate, located at a periphery of the active area and including a stacked structure; and a touch sensor disposed on a side of the active area and the raised area away from the substrate, wherein the touch sensor is electrically insulated from the active area and is in electrical contact with the
(Continued)

raised area; wherein a thickness of the active area matches a thickness of the raised area to ensure a uniform thickness of the touch display panel, and the raised area is electrically insulated from the active area, and a touch signal sensed by the touch sensor is transmitted via the raised area.

18 Claims, 18 Drawing Sheets

(58) Field of Classification Search
USPC .................................. 345/76–83, 173–179
See application file for complete search history.

(56) References Cited

U.S. PATENT DOCUMENTS

| | | | |
|---|---|---|---|
| 2009/0322702 A1 | 12/2009 | Chien et al. | |
| 2010/0265206 A1* | 10/2010 | Chen | G06F 3/0445 345/174 |
| 2013/0027322 A1* | 1/2013 | Hsu | G02B 5/20 345/173 |
| 2014/0132856 A1* | 5/2014 | Hung | C03C 15/00 349/12 |
| 2014/0353691 A1* | 12/2014 | Lee | H01L 27/323 257/88 |
| 2015/0185942 A1* | 7/2015 | Kim | G06F 3/0445 345/173 |
| 2016/0062527 A1* | 3/2016 | Lee | G06F 3/04164 345/173 |
| 2017/0108979 A1* | 4/2017 | Lu | H01L 51/5209 |
| 2017/0213873 A1* | 7/2017 | Bok | G06F 3/0443 |
| 2017/0364188 A1 | 12/2017 | Bae et al. | |

FOREIGN PATENT DOCUMENTS

| | | |
|---|---|---|
| CN | 105845712 A | 8/2016 |
| CN | 107342370 A | 11/2017 |
| CN | 107978611 A | 5/2018 |
| CN | 108920002 A | 11/2018 |
| CN | 105845712 B | 3/2019 |
| CN | 107342370 B | 5/2019 |

OTHER PUBLICATIONS

International Search Report and Written Opinion dated Sep. 4, 2019, from application No. PCT/CN2019/089884.

* cited by examiner

TOUCH DISPLAY PANEL AND MANUFACTURING METHOD FOR REDUCING INTERFERENCE WITH TOUCH SIGNAL

CROSS REFERENCE

This application is the 371 application of PCT Application No. PCT/CN2019/089884, filed Jun. 3, 2019 which is based upon and claims priority to Chinese Patent Application No. 201810715254.X, filed on Jun. 29, 2018, the entire contents of both of which are incorporated herein by reference.

TECHNICAL FIELD

The present disclosure relates to touch display technologies, and in particular, to a touch display panel and a method for manufacturing the touch display panel.

BACKGROUND

At present, with the continuous development of technologies, people hope that a display panel is thinner, lighter, clearer and with a smaller frame. In order to meet these demands, in-cell technology has been developed to achieve a thinner and lighter display panel with a narrower frame. The in-cell technology refers to placing a touch screen panel (TSP) sensor inside a package glass. Compared with an external TSP sensor, a signal line of the touch sensor connected to the outside of the display panel is not necessary, thus achieving an integrated structure and a narrower lower frame. Also, the overall panel can be thinner and lighter by double-sided thinning.

Since an in-cell touch screen panel itself is very thin and light, this requires that inner layers of the panel are designed to ensure display and touch effects of the touch screen panel.

It should be noted that the information disclosed in the Background section above is only for enhancing the understanding of the background of the present disclosure, and thus may include information that does not constitute prior art known to those of ordinary skill in the art.

SUMMARY

Arrangements of the present disclosure provide a touch display panel and a manufacturing method thereof.

According to an aspect of the present disclosure, a touch display panel is provided. The touch display panel includes an active area disposed on a substrate and including a light emitting device. The touch display panel includes a raised area disposed on the substrate, located at a periphery of the active area. The touch display panel includes a stacked structure. The touch display panel includes a touch sensor disposed on sides of the active area and the raised area away from the substrate. The touch sensor is electrically insulated from the active area and is in electrical contact with the raised area. A thickness of the active area matches a thickness of the raised area to ensure a uniform thickness of the touch display panel, the raised area is electrically insulated from the active area, and a touch signal sensed by the touch sensor is transmitted via the raised area.

According to another aspect of the present disclosure, a method for manufacturing a touch display panel is further provided. The method includes forming an active area and a raised area on a substrate. The active area includes a light emitting device, the raised area is disposed in a peripheral area of the active area and includes a stacked structure. The method includes forming a touch sensor on sides of the active area and the raised area away from the substrate. The touch sensor is electrically insulated from the active area and is in electrical contact with the raised area. A thickness of the active area matches a thickness of the raised area to ensure a uniform thickness of the touch display panel, and the raised area is electrically insulated from the active area, and a touch signal sensed by the touch sensor is transmitted via the raised area.

In the touch display panel provided by arrangements of the present disclosure, the raised area is disposed in the peripheral area of the active area, and the raised area is in electrical contact with the touch sensor but is electrically insulated from the active area. In this way, the touch signal sensed by the touch sensor can be transmitted via the stacked structure of the raised area through the raised area, so that the touch signal is protected from being influenced by the signals from the active area, thus ensuring the display and touch effects of the touch screen panel.

BRIEF DESCRIPTION OF THE DRAWINGS

The above and other features and advantages of the present disclosure will become more apparent from the detailed description of exemplary embodiments with referring to the drawings. It is apparent that the drawings in the following description show only some of the embodiments of the present disclosure, and other drawings may be obtained by those skilled in the art without departing from the drawings described herein. In the drawing.

DETAILED DESCRIPTION

Figure 1:
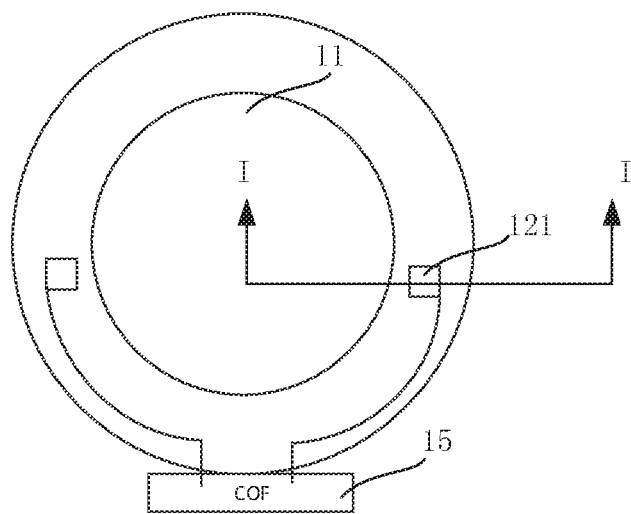
FIG. 1 shows a plan view of a touch display panel according to an example arrangement of the present disclosure.

Example arrangements will now be described more fully with reference to the accompanying drawings. However, the arrangements can be implemented in a variety of forms and should not be construed as being limited to the examples set forth herein; rather, these arrangements are provided so that this disclosure will be more complete so as to convey the idea of the example arrangements to those skilled in this art. The described features, structures, or characteristics in one or more arrangements may be combined in any suitable manner. In the following description, numerous specific details are set forth to provide a thorough understanding of the arrangements of the present disclosure. However, one skilled in the art will appreciate that the technical solutions of the present disclosure may be practiced without one or more of the specific details, or other methods, components, materials, devices, blocks, etc. may be employed. In other instances, well-known technical solutions are not shown or described in detail to avoid obscuring aspects of the present disclosure.

In addition, the drawings are merely schematic representations of the present disclosure and are not necessarily drawn to scale. The same reference numerals in the drawings denote the same or similar parts, and the repeated description thereof will be omitted.

Figure 2:
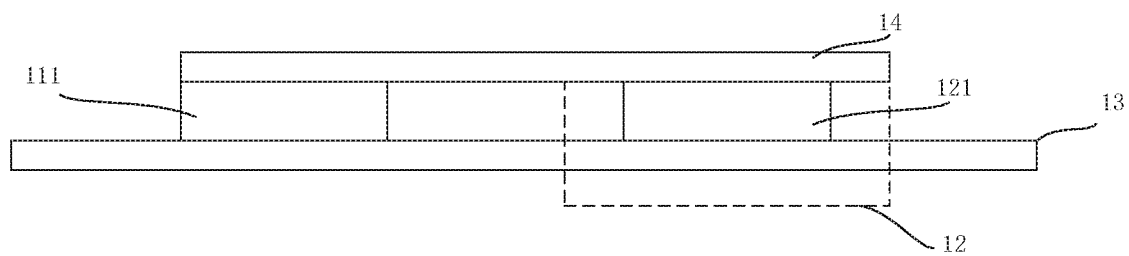
FIG. 2 shows a cross-sectional view taken along line I-I in FIG. 1.

FIG. 1 shows a plan view of a touch display panel according to an example arrangement of the present disclosure. FIG. 2 shows a cross-sectional view taken along line I-I in FIG. 1. Referring to FIGS. 1 and 2, a touch display panel 1 includes an active area (AA) area 11, a raised area 12, and a touch sensor 14. The active area 11 is disposed on a substrate 13, and includes a light emitting device 111. For example, the active area is used to display characters, graphics, and the like. The raised area 12 is disposed on the substrate 13 and located at a periphery of the active area 11, and includes a stacked structure 121. The touch sensor 14 is disposed on sides of the active area 11 and the raised area 12 away from the substrate, is electrically insulated from the active area 11 and is in electrical contact with the raised area 12 (for example, the raised area 12 may be in electrical contact with a side of the stacked structure 121 away from the substrate). The thickness of the active area 11 matches the thickness of the raised area 12 (for example, substantially the same) to ensure that the thickness of the touch display panel 1 is uniform, and the touch signal sensed by the touch sensor 14 is transmitted via the stacked structure 121. In the plan view shown in FIG. 1, since the touch sensor 14 is overlaid on the active area 11 and the raised area 12, thus overlapping with the active area 11 and the raised area 12. The touch sensor 14 is not shown in FIG. 1.

Arrangements of the present disclosure provide a touch display panel having a novel structure in which the raised area is disposed at the periphery of the active area, and the raised area is in electrical contact with the touch sensor but is electrically insulated from the active area. As such, the touch signal sensed by the touch sensor can be transmitted via the stacked structure of the raised area through the raised area, so that the touch signal is protected from being influenced by the signals from the active area, thus ensuring the display and touch effects of the touch screen panel.

According to an example arrangement, the bottom side of the stacked structure along the stacking direction of the stacked structure may be grounded. That is, the stacked structure 121 has a shape similar to a bump. The side of the stacked structure 121 away from the substrate may be in contact with the touch sensor 14 to transmit a touch signal, and the side of the stacked structure 121 away from the touch sensor may be grounded to ensure that the touch signal is not influenced by the signals from the active area 11 (for example, a clock signal in the active area, etc.), thus improving the processing precision of the touch signal. In view of that the stacked structure 121 is formed by stacking a plurality of film layers, one or more film layers (for example, metal film layers) at the bottom of the stacked structure along the stacking direction may be grounded.

In addition, as shown in FIG. 1, the stacked structure 121 may be connected to a chip on film (COF) 15 to transmit the touch signal. The full name of COF 15 is Chip on Film and refers to a technology for forming an integrated circuit (IC) on a flexible printed circuit. The stacked structure 121 is electrically connected to the COF 15, and then transmits the touch signal to the COF 15 which then transmits the touch signal to other circuits (not shown) for processing.

A circular touch display panel is shown in FIG. 1, and the circular touch display panel can be used in some wearable devices. For example, for a watch that has both touch and display functions, the touch display panel as shown in FIG. 1 can be used.

Of course, the shape of the touch display panel provided by the present disclosure is not limited to the circular shape as shown in FIG. 1, but any suitable shape may be adopted. For example, it can be square or rectangular or other shapes. Regardless of the shape, the raised area is disposed at the periphery of the active area to enable the transmission of the touch signal.

Figure 3:
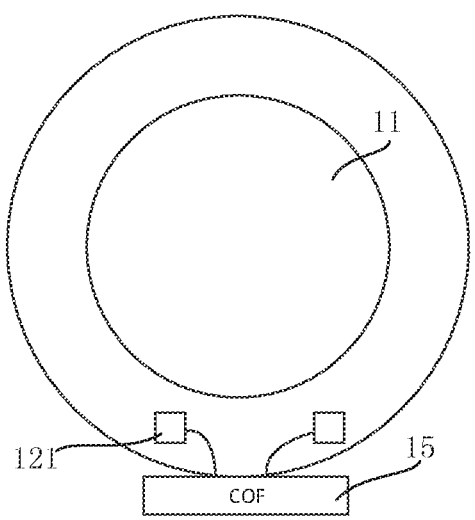
FIG. 3 shows a plan view of another touch display panel according to an example arrangement of the present disclosure.

According to an example arrangement, the stacked structure 121 may be disposed in an area of the raised area 12 where there are a relatively small number of wires, and is not limited to the arrangement as shown in FIG. 1. For example, an arrangement as shown in FIG. 3 can also be employed.

According to an example arrangement, the stacked structure may include a plurality of film layers; at least a portion of the plurality of film layers and at least a portion of film layers of the light emitting device are formed in a same patterning process.

According to an example arrangement, the stacked structure may include:
a first polysilicon layer disposed on the substrate;
a first insulating layer disposed on the first polysilicon layer;
a first metal layer disposed on the first insulating layer;
a second insulating layer disposed on the first metal layer;
a second metal layer disposed on the second insulating layer;
a first interlayer dielectric layer disposed on the second metal layer;
a third metal layer disposed on the first interlayer dielectric layer;
a first intermediate flat layer disposed on the third metal layer;
a top flat layer disposed on the first intermediate flat layer.
The light emitting device can include:
a second polysilicon layer disposed on the substrate;
a third insulating layer disposed on the second polysilicon layer;
a fourth metal layer disposed on the third insulating layer;
a fourth insulating layer disposed on the fourth metal layer;
a fifth metal layer disposed on the fourth insulating layer;
a second interlayer dielectric layer disposed on the fifth metal layer;
a sixth metal layer disposed on the second interlayer dielectric layer;
a second intermediate flat layer disposed on the sixth metal layer;
a light emitting structure disposed on the second intermediate flat layer.

The structure of the touch display panel and the manufacturing process thereof in the present disclosure will be described below by way of specific examples. In the following examples, the insulating layers and the metal layers in the stacked structure may be a gate insulating layer, a gate line, a data line, a power line, or the like of the touch display panel. For example, the first metal layer may be a first gate line layer, the first insulating layer may be a first gate insulating layer, the second metal layer may be a second gate line layer, and the second insulating layer may be a second gate insulating layer, and the third metal layer can be a first data line layer. The insulating layers and the metal layers in the light emitting device may be a gate insulating layer, a gate line, a data line, a power line, or the like of the touch display panel. For example, the third insulating layer may be a third gate insulating layer, the fourth metal layer may be a third gate line layer, the fourth insulating layer may be a fourth gate insulating layer, the fifth metal layer may be a fourth gate line layer, and the sixth metal layer may be a second data line layer.

Figure 4:
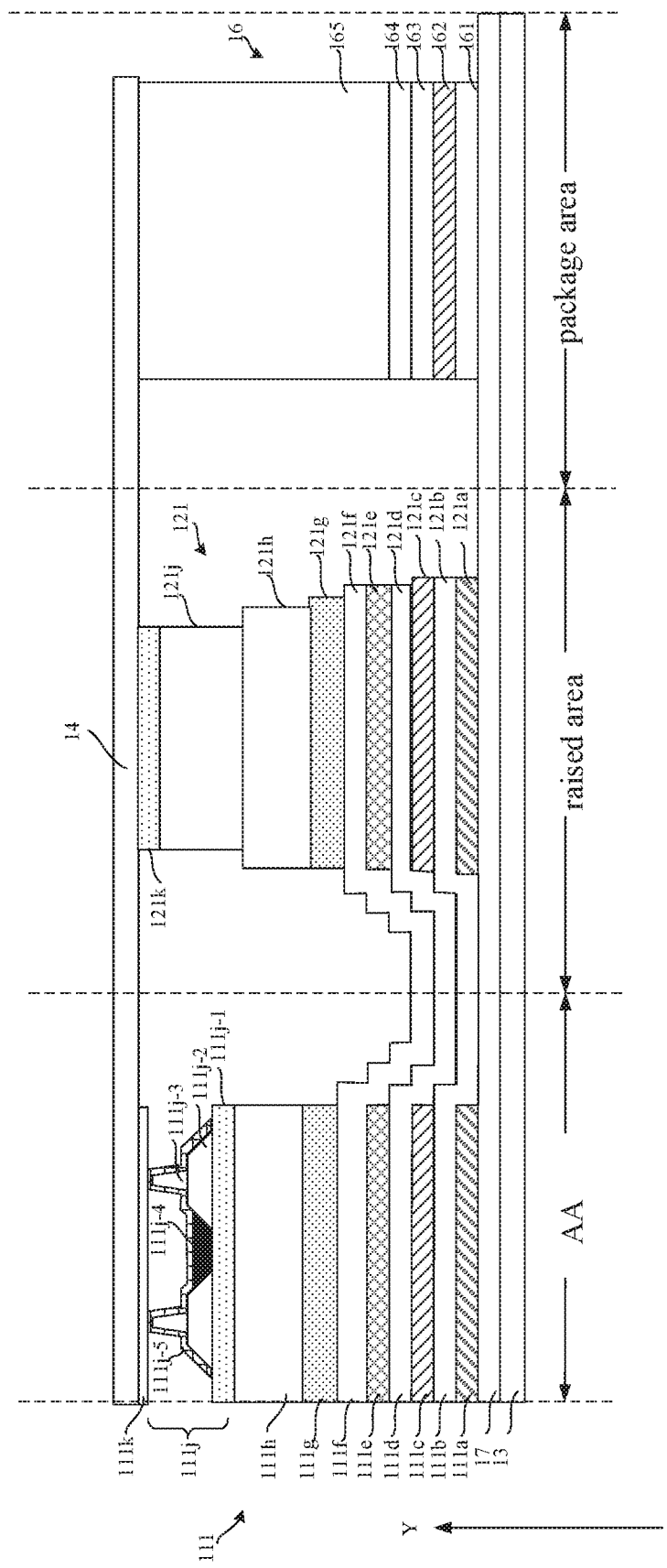
FIG. 4 shows a schematic structural diagram of a touch display panel according to an example arrangement of the present disclosure.

FIG. 4 shows a schematic structural diagram of a touch display panel according to an example arrangement of the present disclosure. In the example shown in FIG. 4, the light emitting device is, for example, an AMOLED (Active-Matrix Organic Light Emitting Diode).

The stacked structure 121 includes: a first polysilicon layer 121a disposed on the substrate; a first gate insulating layer 121b disposed on the first polysilicon layer 121a; a first gate line layer 121c disposed on the first gate insulating layer 121b; a second gate insulating layer 121d disposed on the first gate line 121c; a second gate line 121e disposed on the second gate insulating layer 121d; a first interlayer dielectric layer 121f disposed on the second gate line layer 121e; a first data line layer 121g disposed on the first interlayer dielectric layer 121f; a first intermediate flat layer 121h disposed on the first data line layer 121g; and a top flat layer 121j disposed on the intermediate flat layer 121h.

The light emitting device 111 includes: a second polysilicon layer 111a disposed on the substrate; a third gate insulating layer 111b disposed on the second polysilicon layer 111a; a third gate line layer 111c disposed on the third gate insulating layer 111b; a fourth gate insulating layer 111d disposed on the third gate line layer 111c; a fourth gate line layer 111e disposed on the fourth gate insulating layer 111d; a second interlayer dielectric layer 111f disposed on the fourth gate line layer 111e; a second data line layer 111g disposed on the second interlayer dielectric layer 111f; a second intermediate flat layer 111h disposed on the second data line layer 111g; and a light emitting structure 111j disposed on the second intermediate flat layer 111h.

In the structure shown in FIG. 4, one or more metal film layers at the bottom of the structure along the stacking direction may be grounded, for example, the first polysilicon layer 121a or the first gate line layer 121c may be grounded.

As shown in FIG. 4, the first polysilicon layer 121a and the second polysilicon layer 111a are electrically insulated, the first gate line layer 121c and the third gate line layer 111c are electrically insulated, and the second gate line layer 121e and the fourth gate line layer 111e are electrically insulated, and the first data line layer 121g and the second data line layer 111g are electrically insulated.

The first gate insulating layer 121b and the third gate insulating layer 111b are integrally formed (i.e., the two gate insulating layers are continuous without disconnection), the second gate insulating layer 121d and the fourth gate insulating layer 111d are integrally formed, and the first interlayer dielectric layer 121f and the second interlayer dielectric layer 111f are integrally formed.

In the above manner, the insulating layers (for example, the gate insulating layer, the dielectric layer, and the like) in the stacked structure and the light emitting structure are integrally formed, so that the degree of electrical isolation can be improved, thus ensuring that the signals in the active area do not interfere with the touch signal in the raised area.

In this example, at least a portion of the plurality of film layers in the stacked structure 121 and at least a portion of the film layers of the light emitting device 111 are formed in a same patterning process.

In the example shown in FIG. 4, the first polysilicon layer 121a and the second polysilicon layer 111a are electrically insulated, but may be formed in the same patterning process. For example, the patterns of the first polysilicon layer 121a and the second polysilicon layer 111a may be formed in one mask process, and then the first polysilicon layer 111a and the second polysilicon layer 121a electrically insulated from each other are formed by photolithography, exposure, and the like.

Similarly, the first gate line layer 121c and the third gate line layer 111c may be formed in the same patterning process, and the second gate line layer 121e and the fourth gate line layer 111e may be formed in the same patterning process, the first data line layer 121g and the second data line layer 111g may be formed in the same patterning process, the first gate insulating layer 121b and the third gate insulating layer 111b may be formed in the same patterning process, the second gate insulating layer 121d and the fourth gate insulating layer 111d may be formed in the same patterning process, and the first interlayer dielectric layer 121f and the second interlayer dielectric layer 111f may be formed in the same patterning process.

In the example of FIG. 4, the first intermediate flat layer 121h and the second intermediate flat layer 111h are shown not to be integrally formed. Alternatively, the first intermediate flat layer 121h and the second intermediate flat layer 111h may be integrally formed as other insulating layers.

By forming the at least a portion of the plurality of film layers of the stacked structure 121 and the at least a portion of the film layers of the light emitting device 111 in the same patterning process, it can ensure that the thickness of the active area matches the thickness of the raised area, and the thickness of the panel is uniform, thus avoiding the formation of Newton's rings.

Moreover, the film layer of the raised area can be formed while the active area is being manufactured. The process can be simplified because it is not necessary to fabricate the film layers of the raised area by additional processes.

In addition, the thickness of the top flat layer of the raised area is thicker than that of the other layers to play a role of support. If the film layers of the raised area are not formed while the film layers in the active area are manufactured, but for example, a top flat layer having the same height as the height of the light emitting device is separately formed, the thickness of the top flat layer will be too thick to cause poor uniformity.

In the arrangement shown in FIG. 4, the light emitting device may further include a top insulating layer 111k disposed between the light emitting structure 111j and the touch sensor 14.

The top insulating layer 111k may be made of an insulating material to play a role of insulating and protecting the light emitting structure. The material of the top insulating layer 111k may be selected from materials having a dielectric constant of 2 to 5, preferably smaller than or equal to 3.9. For example, the top insulating layer 111k may be made of silicon dioxide.

The touch sensor 14 is formed of a metal material, and a top cathode of the light emitting structure 111j is also formed of a metal material. A capacitance can be formed between the touch sensor 14, the top insulating layer 111k, and the top cathode of the light emitting structure 111j. In order to avoid excessive capacitance, materials with a dielectric constant smaller than or equal to 3.9 can be selected.

The stacked structure 121 may further include a top conductive layer 121k disposed between the top flat layer 121j and the touch sensor 14. The top conductive layer 121k can be formed of the same material as the anode of the light emitting structure 111j, and plays the role of transmitting the touch signal sensed on the touch sensor 14 to the COF. The top conductive layer 121k can be in direct contact with the touch sensor 14 to achieve direct electrical contact. Alternatively, if the difference between the material of the top conductive layer 121k and the material of the touch sensor 14 is relatively large, for example, a difference in some physical properties may cause stress, then a buffer layer (not shown) or the like may be added between the top conductive layer 121k and the touch sensor 14 to eliminate defects such as stress.

Referring to FIG. 4, the touch screen panel may further include a package area 16 (the frit) disposed at the periphery of the raised area for packaging the touch display panel.

The package area 16 may also have a stacked structure, and the stacked structure may be formed by stacking the film layers same as at least a portion of the plurality of film layers of the effective display area. For example, the package area 16 may include a fifth gate insulating layer 161, a fifth gate line layer 162, a sixth gate insulating layer 163, a third interlayer dielectric layer 164, and a frit printed layer 165. The fifth gate insulating layer 161, the fifth gate line layer 162, the sixth gate insulating layer 163, and the third interlayer dielectric layer 164 may be formed simultaneously with the formation of the metal layers and the insulating layers of the active area (i.e., the effective display area).

The thickness of the package area 16 matches the thickness of the active area and the thickness of the raised area to ensure thickness uniformity of the panel.

Figure 5:
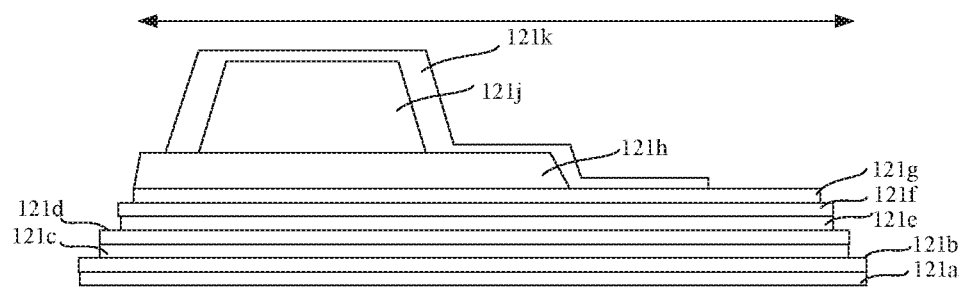
FIG. 5 shows a detailed view of a raised area in a touch screen panel according to an example arrangement of the present disclosure.

FIG. 5 shows a detailed view of a raised area in a touch screen panel according to an example arrangement of the present disclosure. As shown, the stacked structure of the raised area is formed into a stepped stacked structure. In the stacked structure, for two film layers adjacent to each other, the lower film layer protrudes outward by 2-20 μm than the upper film layer. Referring to FIG. 5, the stacked structure is formed in a stepped manner, and the lower film layer is more outward than the upper film layer with respect to the main body portion of the stacked structure (for example, in a direction of the arrow shown in FIG. 5). For example, the width of the upper film layer is smaller than the width of the lower film layer by, for example, 2 to 20 μm (the width here may refer to, for example, the side length of the film layer seen in the plan view). As such, the top conductive layer 121k can be formed along the stepped stack structure extending from the top flat layer to the first data line layer. If the top flat layer needs to be connected to other film layers or components, the top flat layer can be connected by a via provided on a certain insulating layer.

Figure 6:
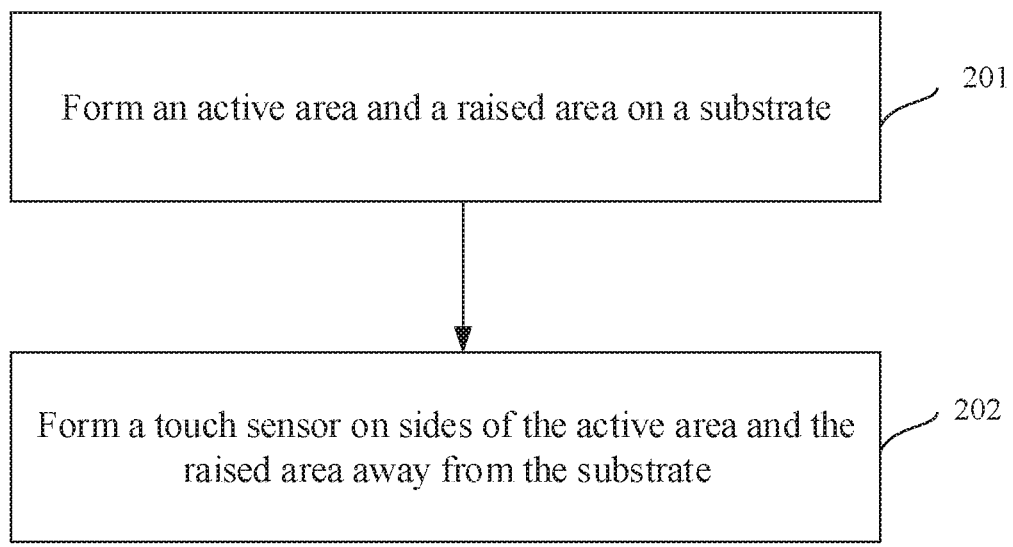
FIG. 6 shows a flow chart of a method for manufacturing a touch display panel according to an example arrangement of the present disclosure.

FIG. 6 shows a flow chart of a method for manufacturing a touch display panel according to an example arrangement of the present disclosure. The method includes the following blocks:

In block 201, an active area and a raised area are formed on the substrate. The active area includes a light emitting device, and the raised area is disposed at a peripheral of the active area and includes a stacked structure.

In block 202, a touch sensor is formed on sides of the active area and the raised area away from the substrate. The touch sensor is electrically insulated from the active area and is in electrical contact with the raised area.

A thickness of the active area matches a thickness of the raised area to ensure that a thickness of the touch display panel is uniform, and the raised area is electrically insulated from the active area, and a touch signal sensed by the touch sensor is transmitted via the raised area.

A side of the stacked structure away from the touch sensor is grounded. The stacked structure may be connected to the chip on film (COF) to transmit the touch signal.

Forming an active area and a raised area on a substrate includes forming the stacked structure of the raised areas while forming the light emitting device of the active area. At least a portion of the plurality of film layers of the stacked structure and at least a portion of the film layers of the light emitting device are formed in the same patterning process.

The manufacturing flow of the touch display panel shown in FIG. 4 will be described in detail below with reference to FIGS. 7 to 20.

Figure 7:
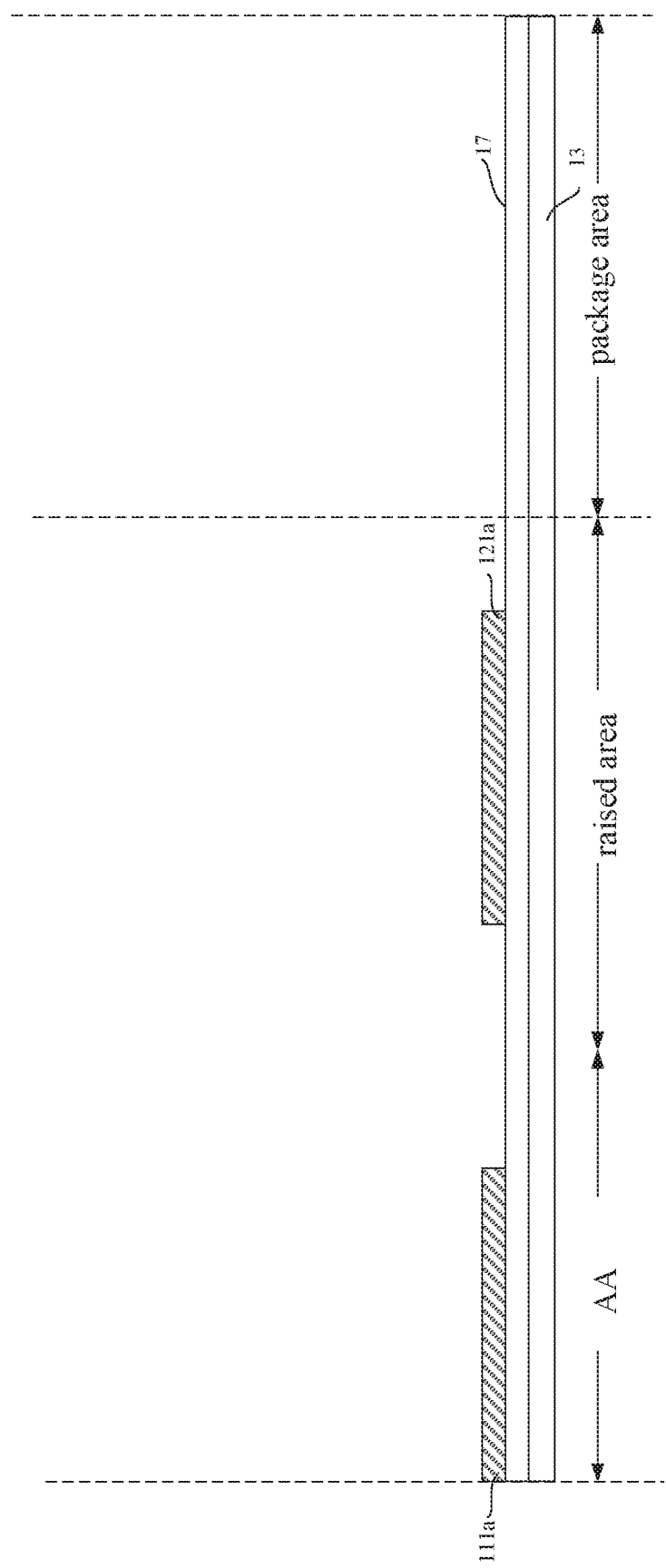
FIGS. 7 to 20 show blocks of a method for manufacturing a touch screen panel shown in FIG. 4.

First, a buffer insulating layer 17 is deposited on a transparent substrate 13 (for example, a glass substrate), and then a polysilicon layer is formed, and a first polysilicon layer 121a and a second polysilicon layer 111a are formed by exposure, as shown in FIG. 7.

Figure 8:
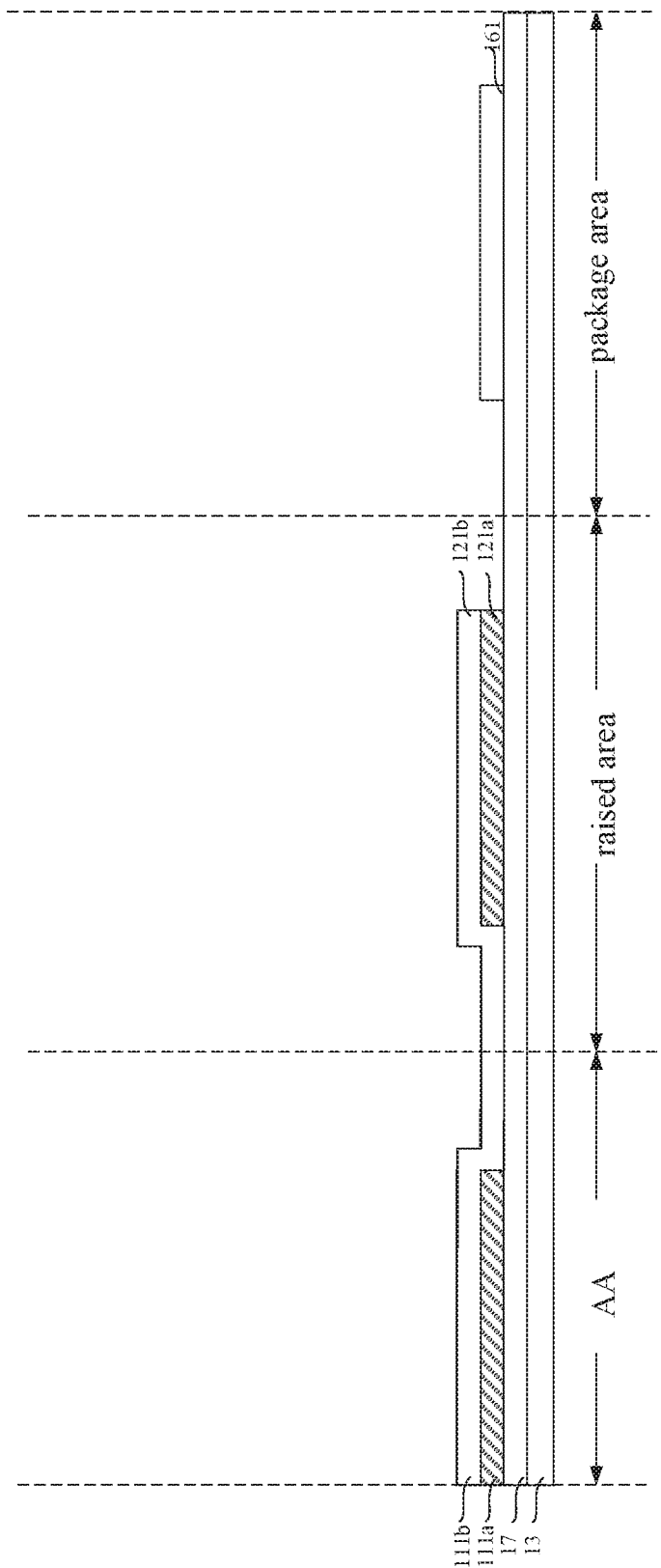

Then, an insulating layer is formed on the substrate 13, and a first gate insulating layer 121b and a second gate insulating layer 111b are formed by a corresponding process, as shown in FIG. 8. At the same time, a fifth gate insulating layer 161 of the package area can also be formed.

Figure 9:
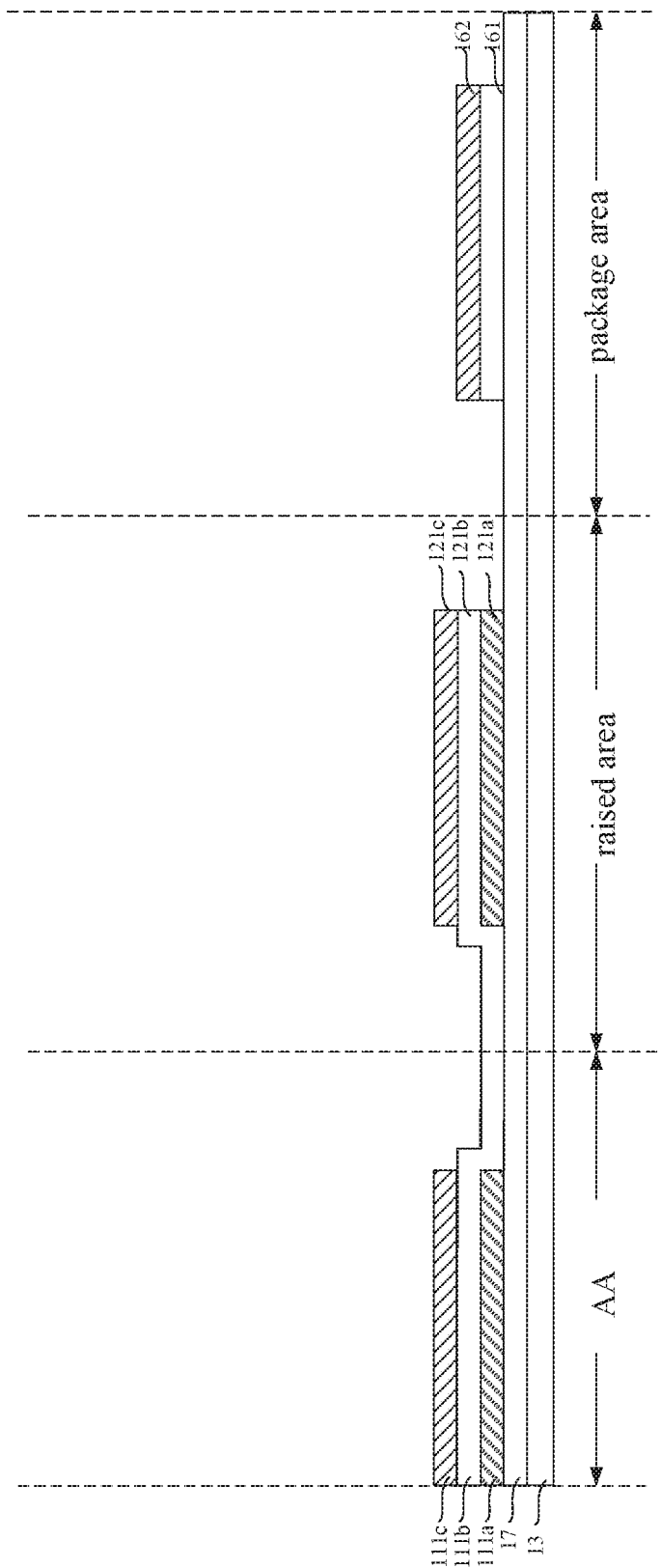

Then, the first gate line layer 121c and the third gate line layer 111c are formed by etching, exposure, or the like, as shown in FIG. 9. Other signal lines, such as a reset line or the like, may also be formed in this block. In addition, a fifth gate line layer 162 of the package area may also be formed.

Figure 10:
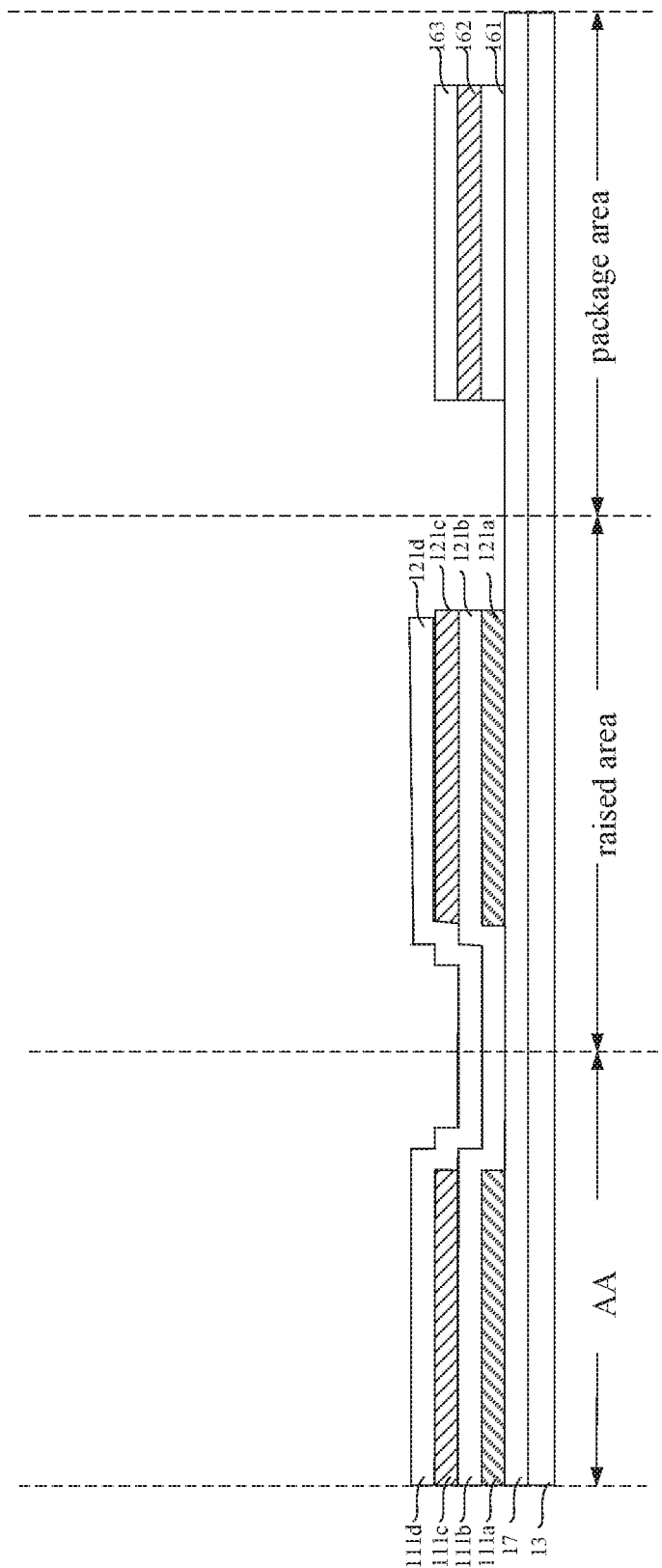

Then, the second gate insulating layer 121d and the fourth gate insulating layer 111d are formed by a corresponding process, as shown in FIG. 10. At the same time, a sixth gate insulating layer 163 of the package area can also be formed.

Figure 11:
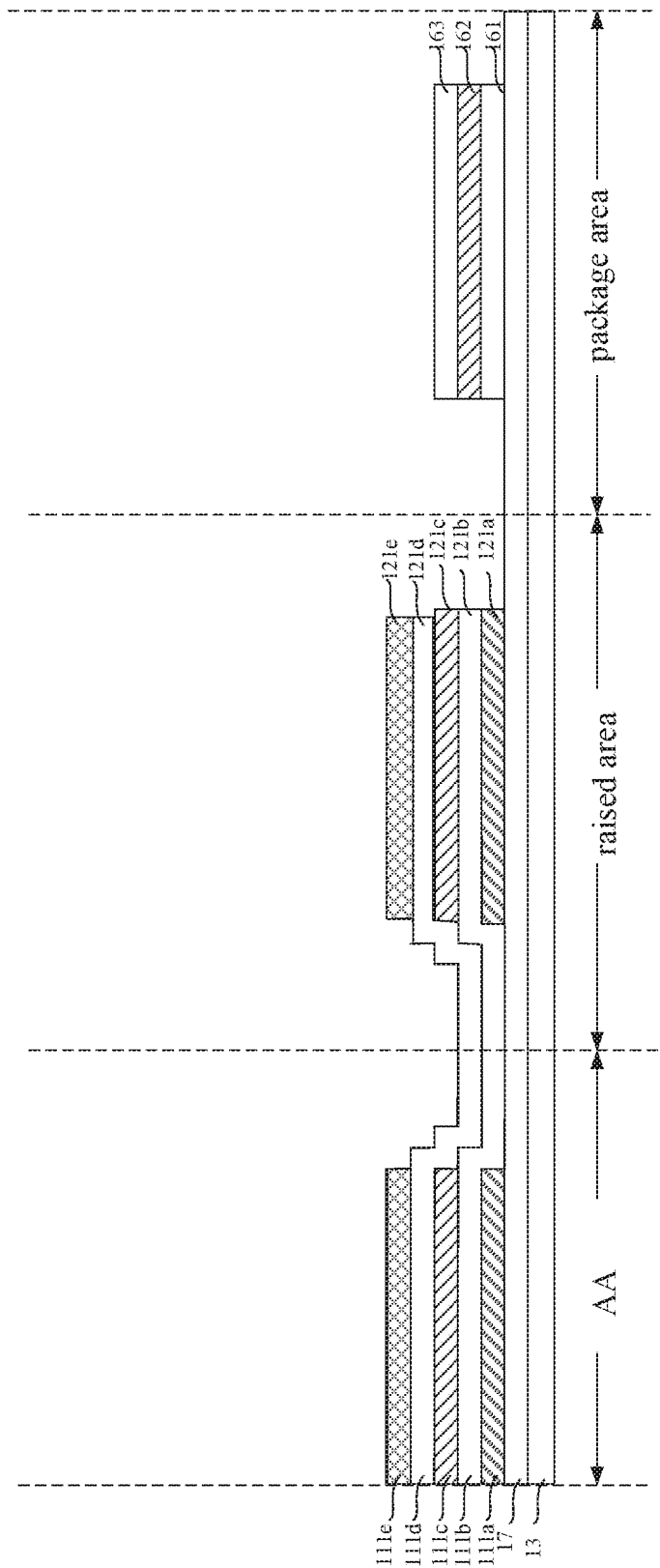

Next, the second gate line layer 121e and the fourth gate line layer 111e are formed by a process such as etching, exposure, or the like, as shown in FIG. 11. The metal layer formed in this block may form a capacitance with the metal layer formed as in FIG. 9.

Figure 12:
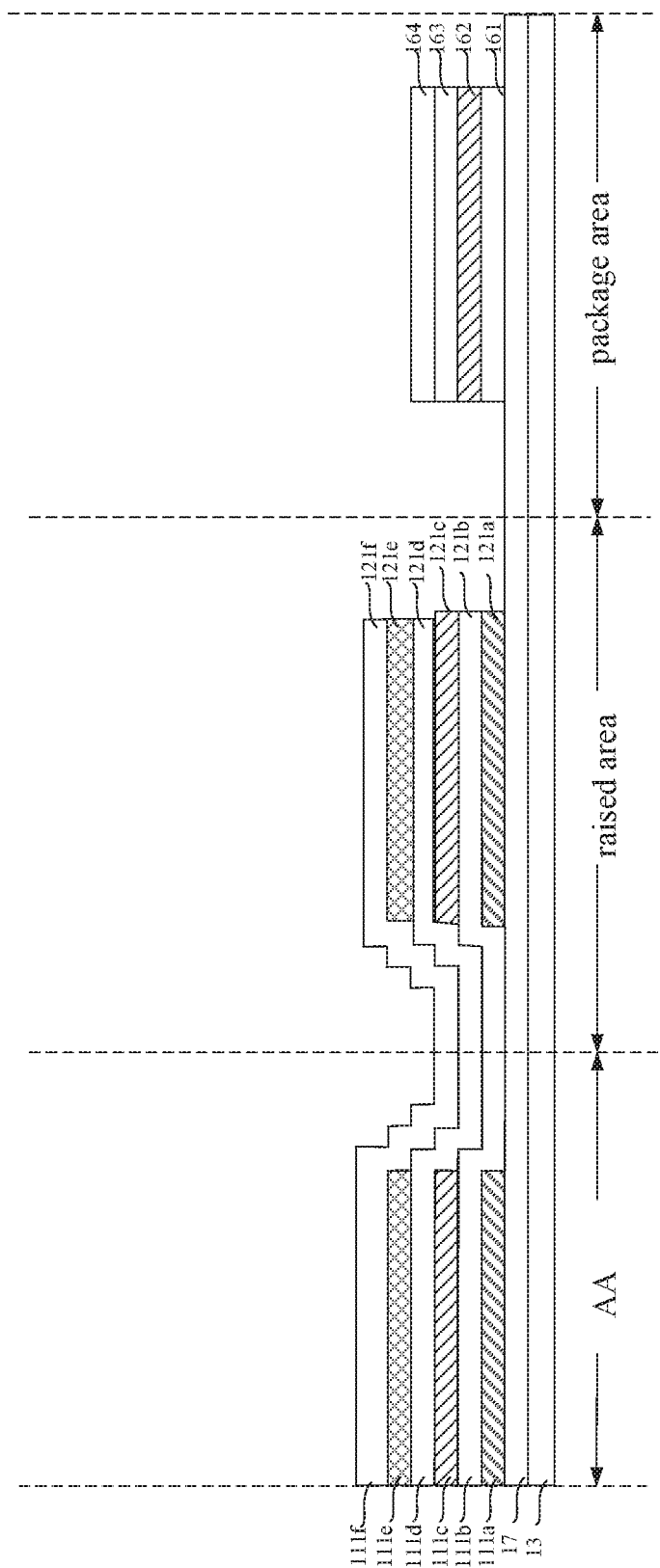

Next, an insulating material is formed on the substrate 13, and a first interlayer dielectric layer 121f and a second interlayer dielectric layer 111f are formed by a corresponding process, as shown in FIG. 12. A via may be disposed in the first interlayer dielectric layer 121f and the second interlayer dielectric layer 111f as a via layer.

Figure 13:
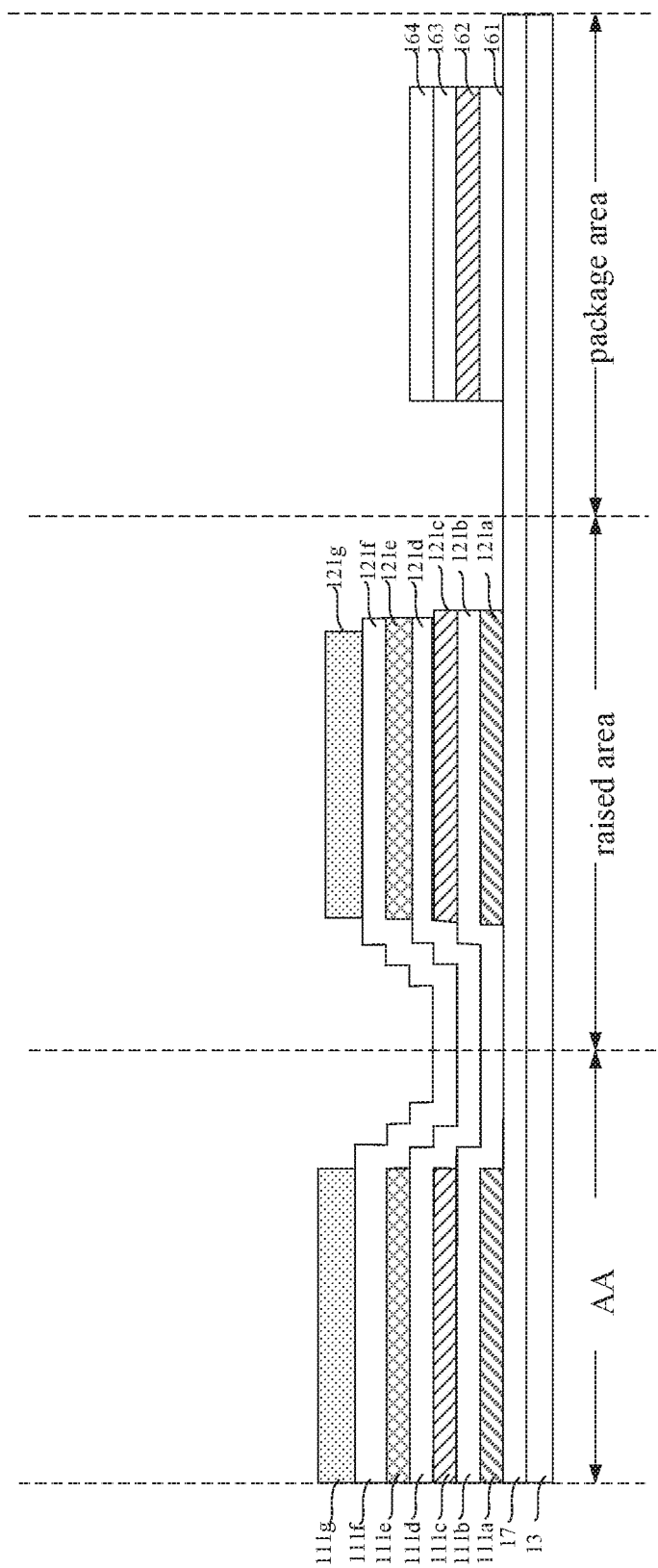

Next, a metal oxide material is formed (for example, by a process such as deposition). A first data line layer 121g and a second data line layer 111g are formed by etching, exposure, or the like, as shown in FIG. 13. The first data line layer 111g can be used to form a data line, a power line (VDD), etc. The second data line layer 111g may be connected to the third gate line layer 111c and the fourth gate line layer 111e through the via formed in the second interlayer dielectric layer 111f.

Figure 14:
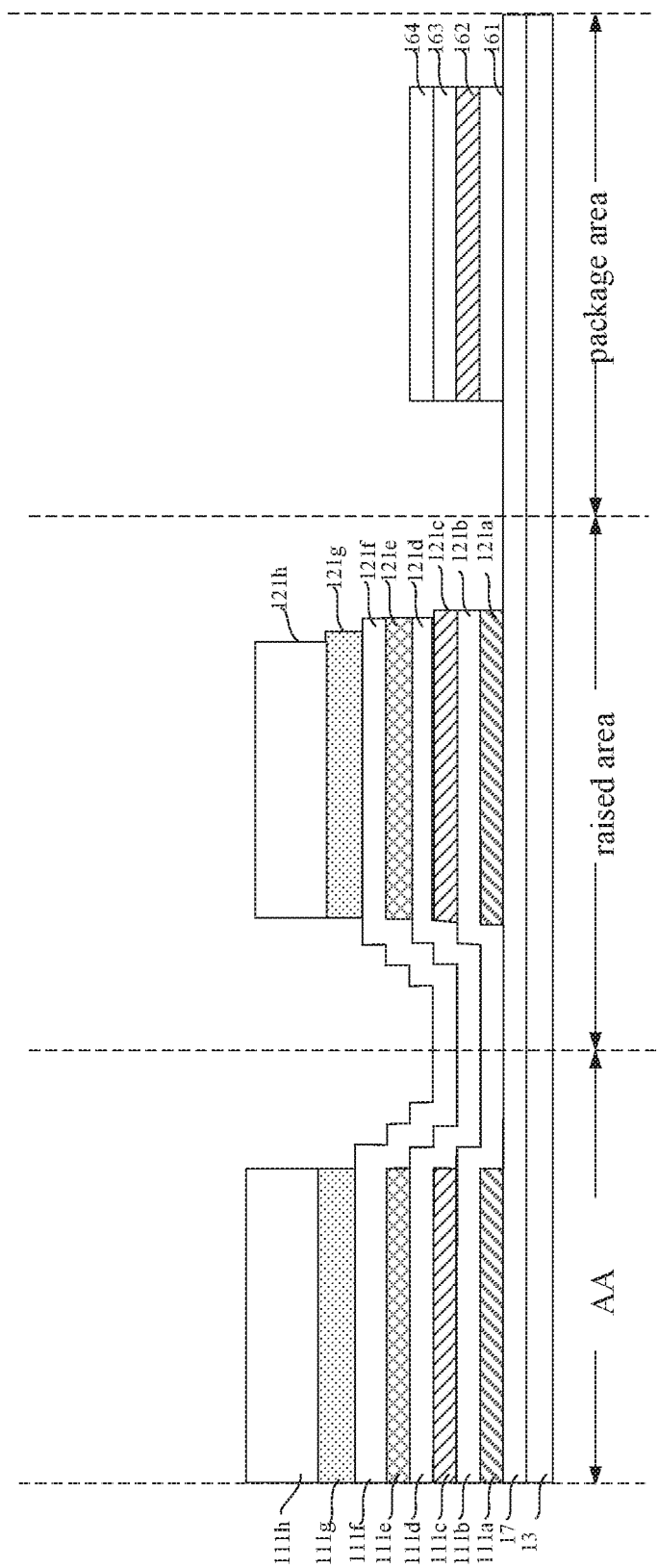

Next, an insulating material is formed on the substrate 13, and a first intermediate flat layer 121h and a second intermediate flat layer 111h are formed by a corresponding process, as shown in FIG. 14, to protect the film layers and the circuits formed in the previous blocks.

Figure 15:
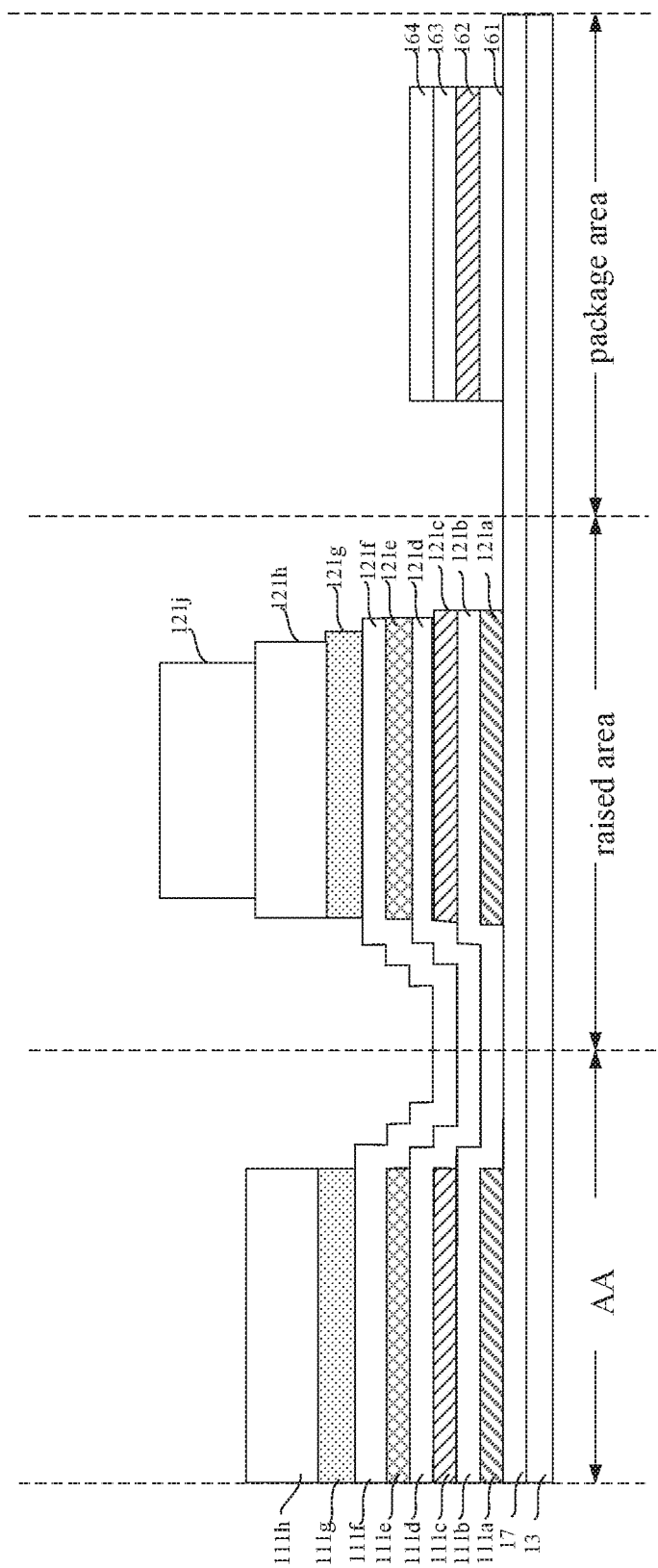

Next, an insulating material is formed on the structure as shown in FIG. 14, and a top flat layer 121j is formed by a corresponding process, as shown in FIG. 15. The top flat layer 121j functions as a protrusion, to make a metal layer (such as the top conductive layer in FIG. 4) that is in contact with the metal layer in the touch sensor 14 (only the touch sensor 14 is shown in FIG. 4, and actually the touch sensor 14 itself may also include multiple film layers) is raised to ensure effective overlap or contact. The height of the raised portion (i.e., the top flat layer 121*j*) highly matches the height of the active area and the height of the package area.

Figure 16:
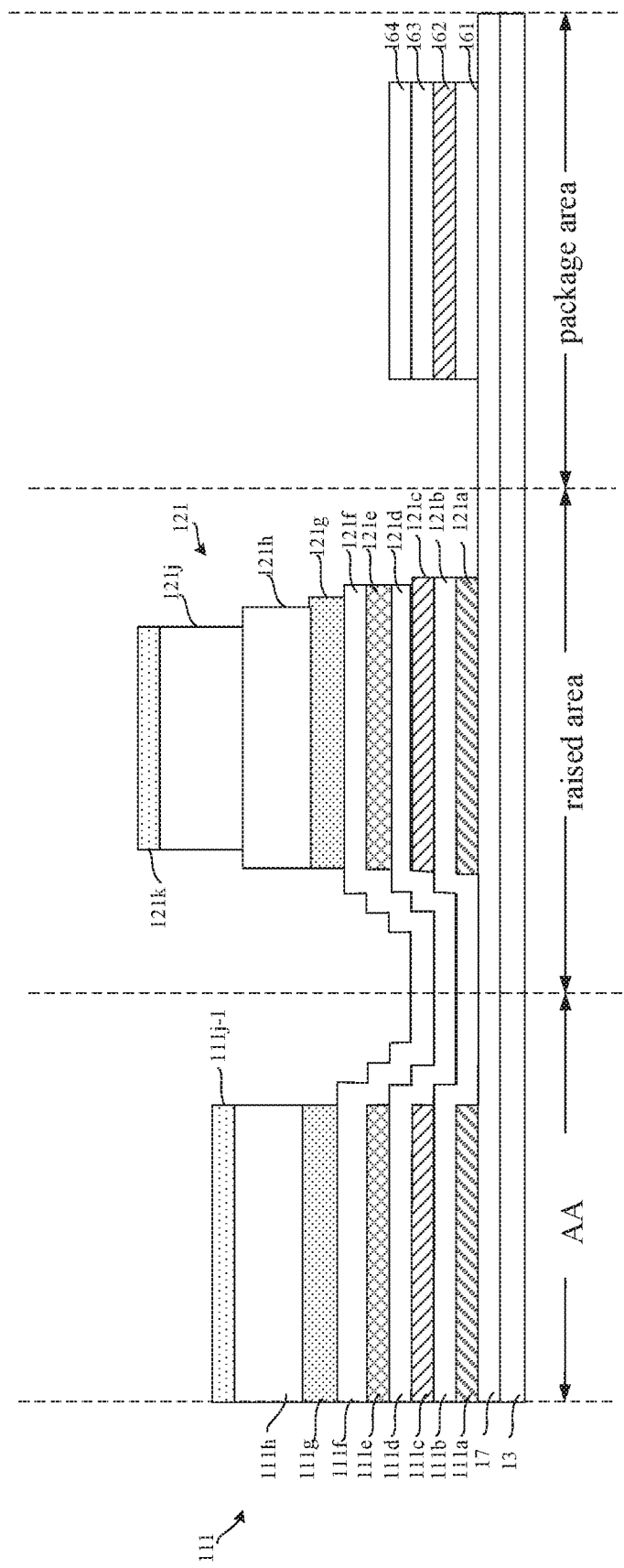

Next, a metal material is deposited on the structure as shown in FIG. 15 to form an anode 111*j*-1 of the light-emitting structure 111*j* as shown in FIG. 16. It is also possible to simultaneously form the top conductive layer 121*k* in the stacked structure in this block.

Figure 17:
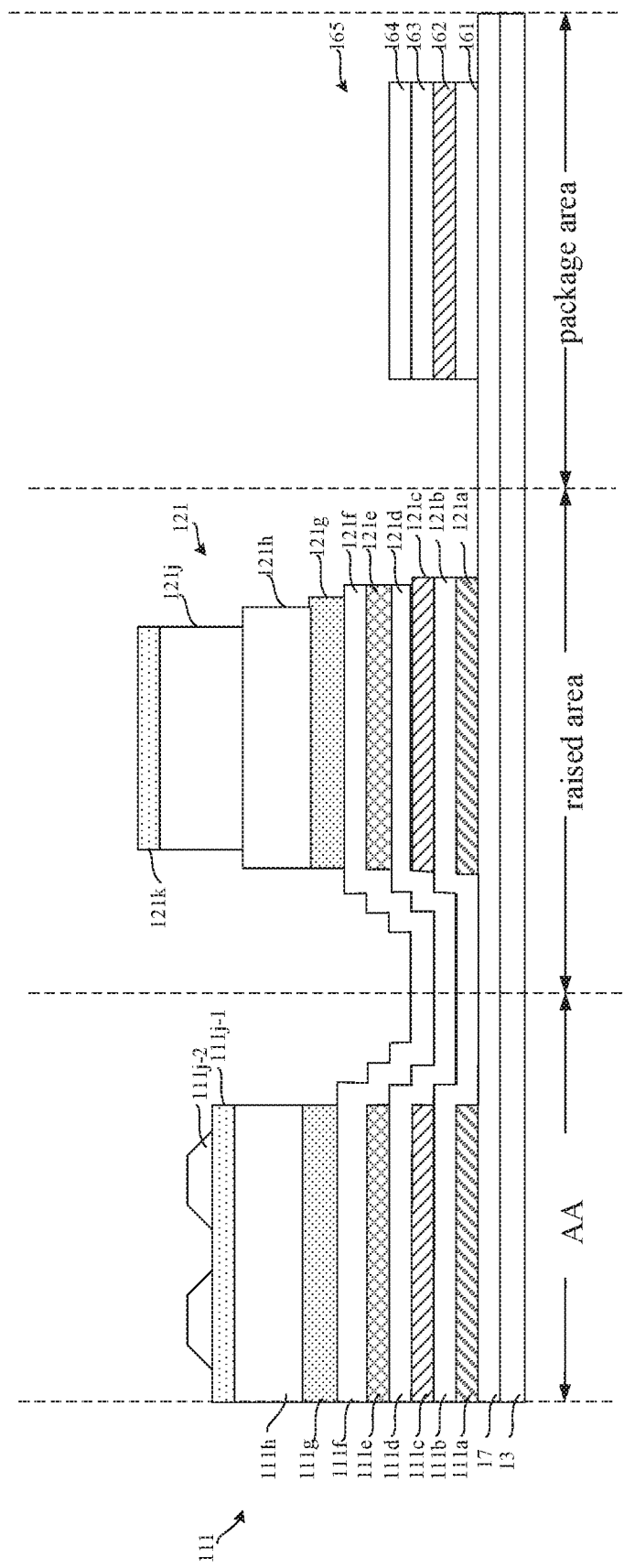

Next, the insulating pattern 111*j*-2 is formed to determine the area where the organic light emitting material is evaporated, and the insulating pattern 111*j*-2 also plays the role of flattening, as shown in FIG. 17. The insulating pattern 111*j*-2 serves as a pixel defining layer.

Figure 18:
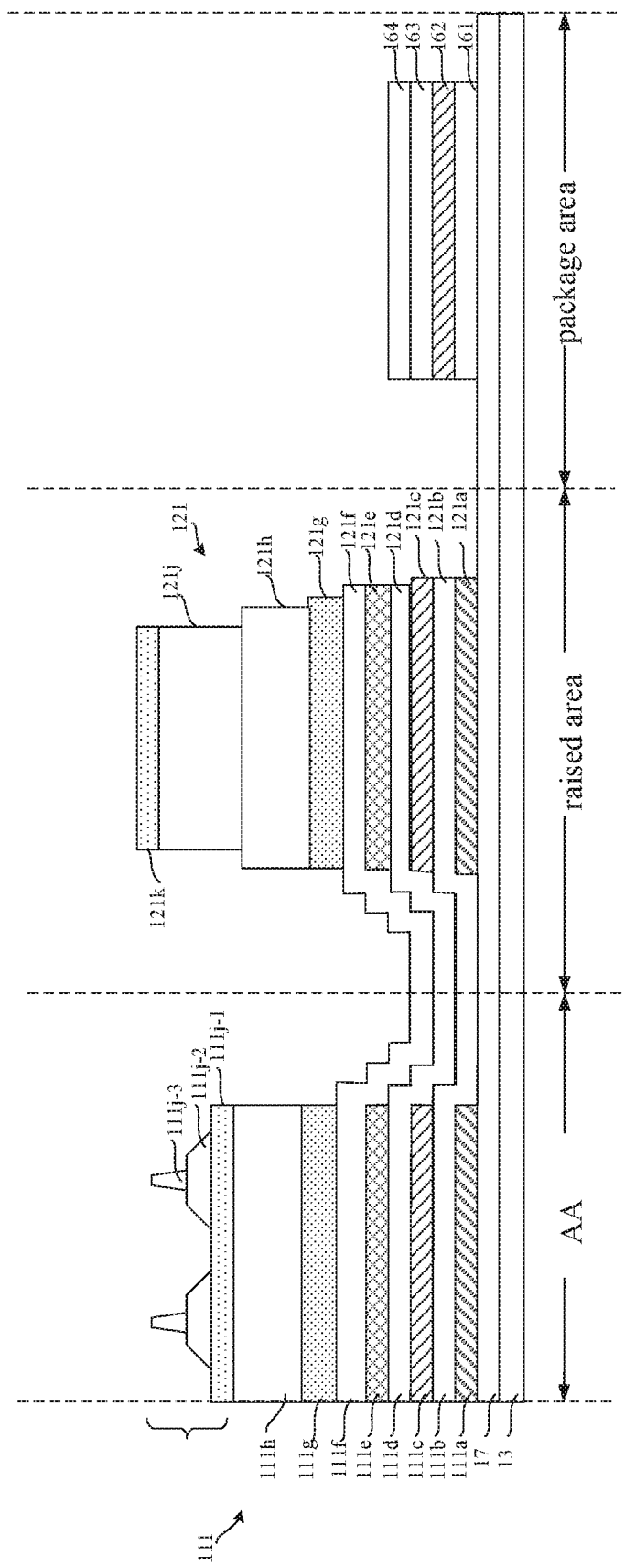

Next, an insulating protrusion (for example, a photo spacer) 111*j*-3 is formed and plays the role of support to define a gap between the touch sensor and the light emitting structure (the gap may be filled with nitrogen), as shown in FIG. 18.

Figure 19:
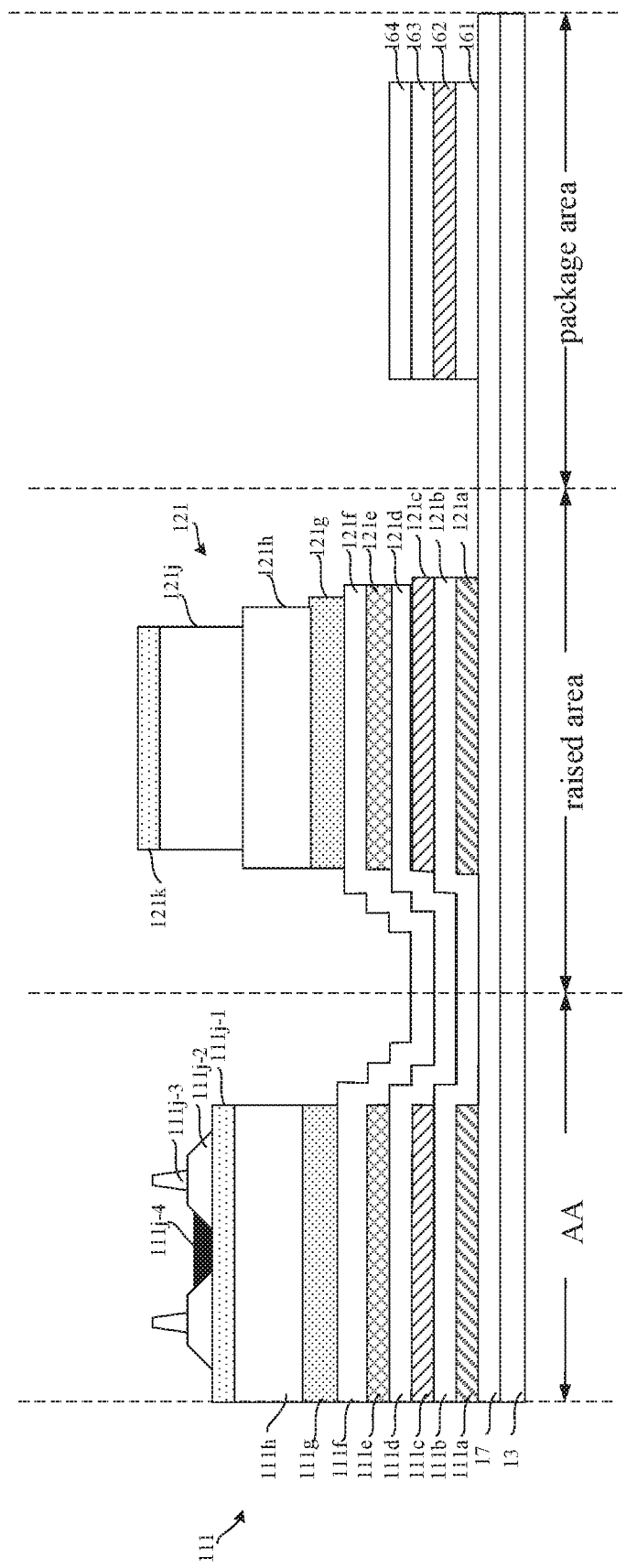

Then, the organic light-emitting material 111*j*-4 is formed (for example, evaporated) in a defined area of the light-emitting layer as shown in FIG. 19.

Figure 20:
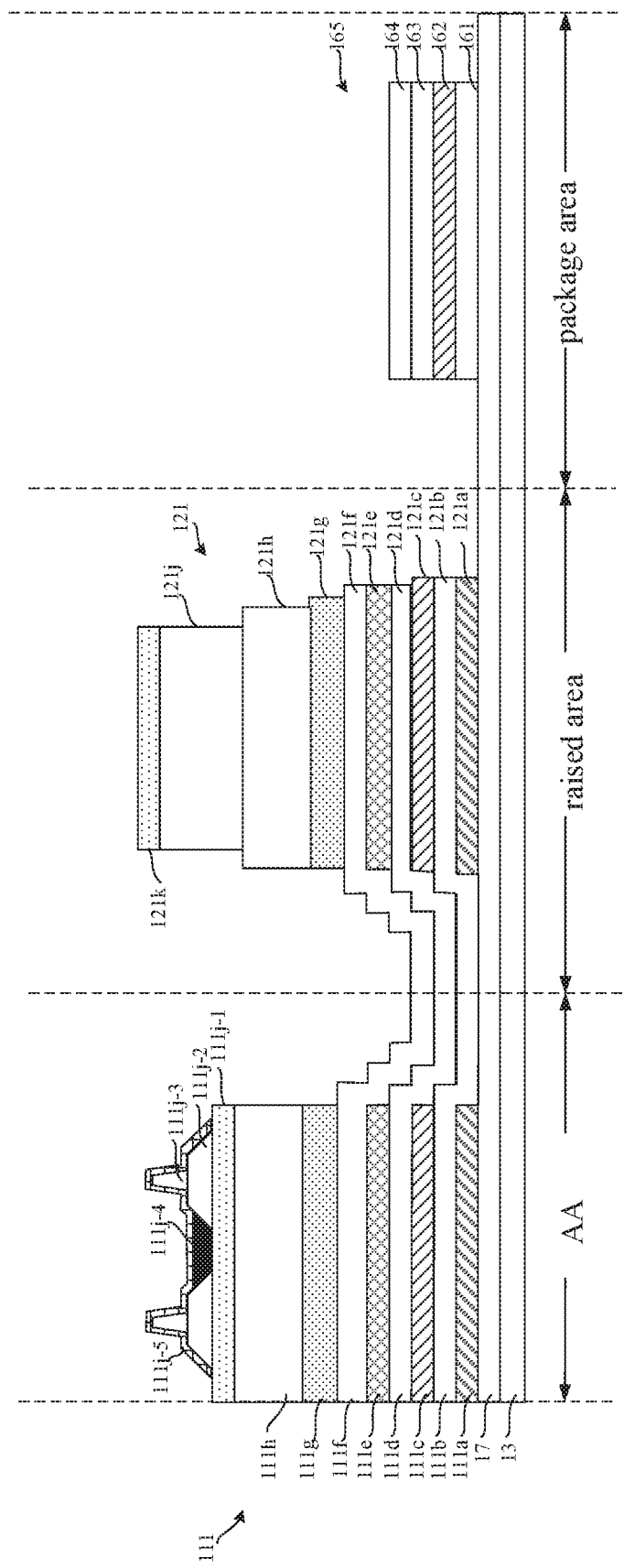

Thereafter, a metal material is formed on the substrate to form a cathode 111*j*-5 of the light-emitting structure 111*j*, as shown in FIG. 20.

The touch sensor has an insulating protective layer, and then the package glass including the touch sensor is placed on the panel, so that the metal layer in the touch sensor overlaps or contacts with the top conductive layer 121*k* of the raised area. Then the touch screen panel as shown in FIG. 4 is formed. The conductive layer in the touch sensor and the top conductive layer can be made of the same material (for example, metal or ITO).

In addition, the frit printed layer 165 of the package area may be formed after the evaporation or module process and before the formation of the touch screen panel.

In order to ensure that the capacitance formed is small, the height of the insulating pattern 111*j*-2 may be 8000-15000 angstroms, the height of the insulating protrusion 111*j*-3 may be 6000-15000 angstroms, and the height of the frit printed layer 165 of the package area 16 can be 3 um-5 um. It is to be noted that the height herein refers to the dimension along the Y-axis in the cross-sectional view as shown in FIG. 4. In the height ranges of the above film layers, the metal layer of the touch sensor is in close contact with the metal layer on the top flat layer to ensure signal connectivity.

In the touch screen panel, the flatness of the top flat layer may be within 3% of the thickness of the top flat layer, the height of the top flat layer may be 6000-20000 angstroms, and the area of the top flat layer may be 400 square microns.

In the raised area, the width of the top flat layer is 2-20 um smaller than the width of the intermediate flat layer, the width of the intermediate flat layer is 2-20 um smaller than the width of the second data line layer, the width of the second data line layer is 2-20 um smaller than the second interlayer insulating layer, the width of the second interlayer insulating layer is 2-20 um smaller than the width of the fourth gate line layer, and the width of the fourth gate line layer is 2-20 um smaller than the width of the fourth gate insulating layer. The "width" herein may refer to the side length of the pattern of each film layer. For example, if the pattern of a certain film layer is a square, the width may refer to the side length of the square.

It should be noted that although the light emitting device of the active area in some arrangements of the present disclosure is an AMOLED, the active area may have other types of light emitting devices in other arrangements, such as an OLED, a liquid crystal display, or the like.

In arrangements of the present disclosure, a film layer structure that realizes an in-cell structure different from other modes is proposed, and the requirements for important manufacturing processes are clearly stated. It can effectively ensure that the display effect of the active area is not affected, and the touch signal is effectively transmitted to circuits, and the proposed structure has process feasibility.

Figure 21:
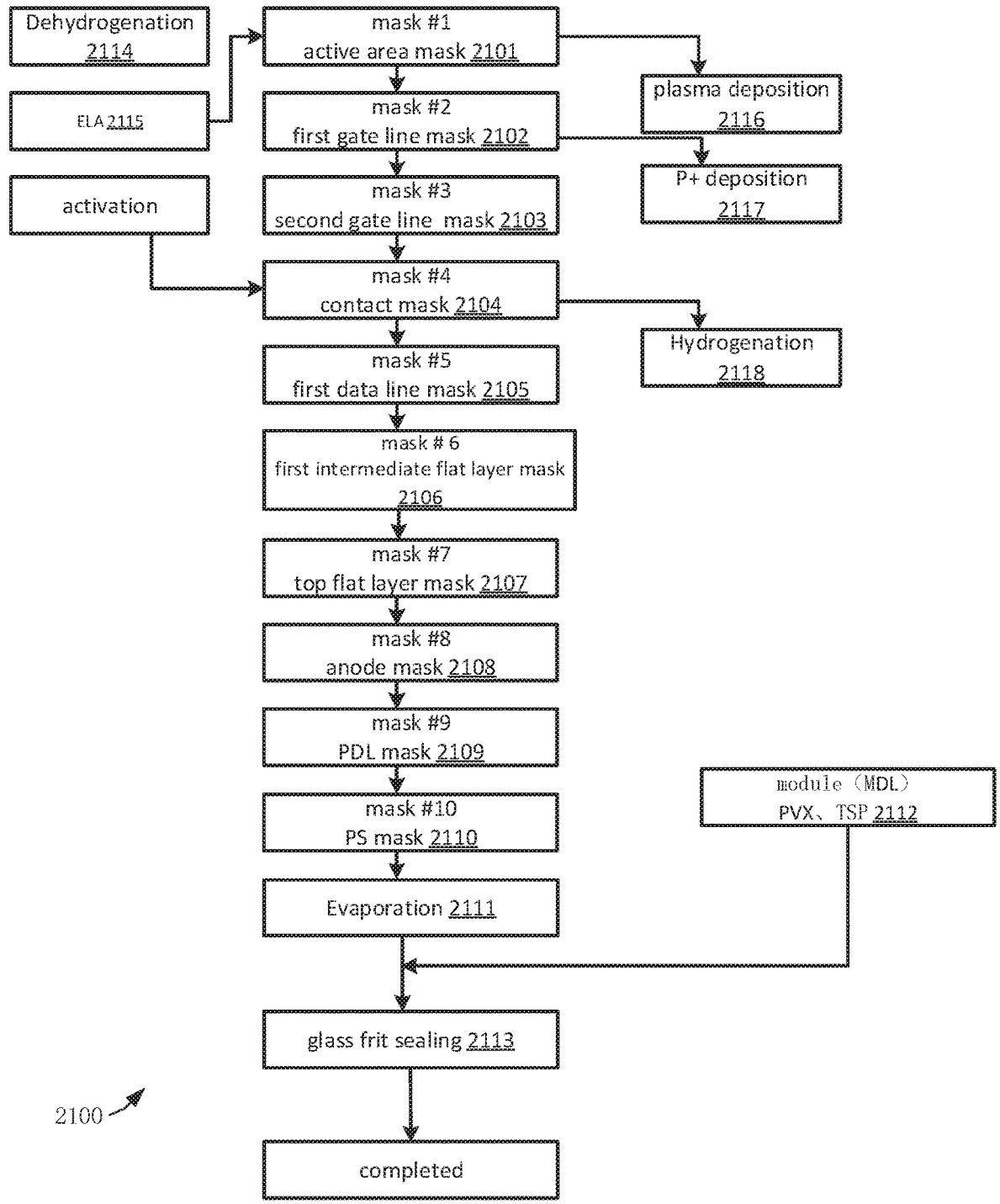
FIG. 21 shows a schematic view of a corresponding mask and a corresponding process in a touch display panel manufacturing procedure according to an arrangement of the present disclosure.

FIG. 21 shows a schematic view of a corresponding mask and a corresponding process 2100 in a touch display panel manufacturing process according to an arrangement of the present disclosure. As shown, an active area is formed through the mask #1 (2101). The first gate line layer is formed through the mask #2 (2102). The second gate line layer is formed through the mask #3 (2103). The via in the insulating layer is formed for achieving contact through the mask #4 (2104). The first data line layer is formed through the mask #5 (2105). The first intermediate flat layer is formed through the mask #6 (2106). Atop flat layer is formed through mask #7 (2107). The anode (i.e., the top conductive layer) is formed through the mask #8 (2108). The insulating pattern 111*j*-2 is formed through the mask #9 (2109). A photo spacer (PS) is formed through the mask #10 (2110). Thereafter, the luminescent material is evaporated (2111), a passivation layer (PVX) is formed, a touch sensor (TSP) is assembled (2112), and the package (such as, glass frit sealing) is performed (2113) to complete the manufacturing processes of the display panel. Each of the above mask patterning processes can also be combined with dehydrogenation (2114), excimer laser annealing (ELA) (2115), activation, plasma deposition (2116), P+ deposition (2117), hydrogenation (2118), and the like.

Other arrangements of the present disclosure will be apparent to those skilled in the art, after they consider the specification and practice the disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and arrangements are illustrative, and the real scope and spirit of the present disclosure is defined by the appended claims.

What is claimed is:
1. A touch display panel, comprising:
an active area disposed on a substrate and comprising a light emitting device;
a raised area disposed on the substrate, located at a periphery of the active area, and comprising a stacked structure; and
a touch sensor disposed on sides of the active area and the raised area away from the substrate, wherein the touch sensor is electrically insulated from the active area and is in electrical contact with the raised area;
wherein a thickness of the active area matches a thickness of the raised area to ensure a uniform thickness of the touch display panel, the raised area is electrically insulated from the active area, and a touch signal sensed by the touch sensor is transmitted via the raised area;
wherein the stacked structure comprises a plurality of film layers; and at least a portion of the plurality of film layers and at least a portion of film layers of the light emitting device are formed in a same patterning process;
wherein the stacked structure comprises:
a first polysilicon layer disposed on the substrate;
a first insulating layer disposed on the first polysilicon layer;
a first metal layer disposed on the first insulating layer;
a second insulating layer disposed on the first metal layer;
a second metal layer disposed on the second insulating layer;
a first interlayer dielectric layer disposed on the second metal layer;
a third metal layer disposed on the first interlayer dielectric layer;
a first intermediate flat layer disposed on the third metal layer; and
a top flat layer disposed on the first intermediate flat layer.

2. The touch display panel of claim 1, wherein a side of the stacked structure away from the touch sensor is grounded.

3. The touch display panel of claim 2, wherein the side of the stacked structure away from the touch sensor along a stacking direction of the stacked structure is grounded.

4. The touch display panel of claim 1, wherein the stacked structure is connected to a chip on film (COF) to transmit the touch signal.

5. The touch display panel of claim 1, wherein the light emitting device comprises: a plurality of metal layers, a plurality of insulating layers, and a light emitting structure; and
the plurality of film layers of the stacked structure comprise a top flat layer and a plurality of metal layers and a plurality of insulating layers which are disposed alternately;
the plurality of metal layers in the light emitting device are electrically insulated from the plurality of metal layers in the stacked structure; and
the plurality of insulating layers in the light emitting device are integrally formed with corresponding ones in the plurality of insulating layers in the stacked structure.

6. The touch display panel of claim 5, wherein flatness of the top flat layer is within 3% of a thickness of the top flat layer.

7. The touch display panel of claim 1, wherein the light emitting device comprises:
a second polysilicon layer disposed on the substrate;
a third insulating layer disposed on the second polysilicon layer;
a fourth metal layer disposed on the third insulating layer;
a fourth insulating layer disposed on the fourth metal layer;
a fifth metal layer disposed on the fourth insulating layer;
a second interlayer dielectric layer disposed on the fifth metal layer;
a sixth metal layer disposed on the second interlayer dielectric layer;
a second intermediate flat layer disposed on the sixth metal layer; and
a light emitting structure disposed on the second intermediate flat layer.

8. The touch display panel of claim 7, wherein the light emitting device further comprises:
a top insulating layer disposed between the light emitting structure and the touch sensor.

9. The touch display panel of claim 8, wherein the top insulating layer has a dielectric constant smaller than or equal to 3.9.

10. The touch display panel of claim 7, wherein the stacked structure further comprises a top conductive layer disposed between the top flat layer and the touch sensor.

11. The touch display panel of claim 1, wherein the top flat layer has a height of 6000 to 20,000 angstroms.

12. The touch display panel of claim 1, wherein the top flat layer has an area greater than 400 square microns.

13. The touch screen panel of claim 1, wherein the stacked structure is formed in a stepped stacked structure.

14. The touch display panel of claim 13, wherein in the stacked structure, for two film layers adjacent to each other, a lower film layer in the two film layers protrudes outward by 2-20 μm more than an upper film layer in the two film layers.

15. The touch display panel of claim 1, further comprising:
a package area disposed at a periphery of the raised area for encapsulating the touch display panel.

16. A method for manufacturing a touch display panel, comprising:
forming an active area and a raised area on a substrate, wherein the active area comprises a light emitting device, and the raised area is disposed in a peripheral area of the active area and comprises a stacked structure; and
forming a touch sensor on sides of the active area and the raised area away from the substrate, wherein the touch sensor is electrically insulated from the active area and is in electrical contact with the raised area;
wherein a thickness of the active area matches a thickness of the raised area to ensure a uniform thickness of the touch display panel, the raised area is electrically insulated from the active area, and a touch signal sensed by the touch sensor is transmitted via the raised area;
wherein the stacked structure comprises a plurality of film layers; and
at least a portion of the plurality of film layers and at least a portion of film layers of the light emitting device are formed in a same patterning process;
wherein the stacked structure comprises:
a first polysilicon layer disposed on the substrate;
a first insulating layer disposed on the first polysilicon layer;
a first metal layer disposed on the first insulating layer;
a second insulating layer disposed on the first metal layer;
a second metal layer disposed on the second insulating layer;
a first interlayer dielectric layer disposed on the second metal layer;
a third metal layer disposed on the first interlayer dielectric layer;
a first intermediate flat layer disposed on the third metal layer; and
a top flat layer disposed on the first intermediate flat layer.

17. The method of claim 16, wherein a side of the stacked structure away from the touch sensor is grounded.

18. The method of claim 16, further comprising: connecting the stacked structure to a chip on film (COF) to transmit the touch signal.

* * * * *